US010807185B2

(12) United States Patent
Mitsuzumi et al.

(10) Patent No.: US 10,807,185 B2
(45) Date of Patent: Oct. 20, 2020

(54) WELDING APPARATUS AND WELDING METHOD

(71) Applicant: PRIMETALS TECHNOLOGIES JAPAN, LTD., Hiroshima-shi, Hiroshima (JP)

(72) Inventors: Tatsuki Mitsuzumi, Hiroshima (JP); Ryosuke Mitsuoka, Hiroshima (JP); Takafumi Nakaya, Hiroshima (JP); Yujiro Watanabe, Hiroshima (JP); Hirotoshi Tagata, Hiroshima (JP); Ryusuke Kimoto, Takasago (JP)

(73) Assignee: PRIMETALS TECHNOLOGIES JAPAN, LTD., Hiroshima-Sh (JP)

( * ) Notice: Subject to any disclaimer, the term of this patent is extended or adjusted under 35 U.S.C. 154(b) by 269 days.

(21) Appl. No.: 15/757,224

(22) PCT Filed: Nov. 6, 2017

(86) PCT No.: PCT/JP2017/039911
§ 371 (c)(1),
(2) Date: Mar. 2, 2018

(87) PCT Pub. No.: WO2019/087386
PCT Pub. Date: May 9, 2019

(65) Prior Publication Data
US 2019/0134734 A1 May 9, 2019

(51) Int. Cl.
*B23K 11/06* (2006.01)
*C21D 9/50* (2006.01)
(Continued)

(52) U.S. Cl.
CPC ............ *B23K 11/061* (2013.01); *B23K 9/328* (2013.01); *B23K 11/16* (2013.01);
(Continued)

(58) Field of Classification Search
CPC ...... B23K 9/328; B23K 11/04; B23K 11/061; B23K 11/087; B23K 11/16;
(Continued)

(56) References Cited

U.S. PATENT DOCUMENTS 4,747,903 A * 5/1988 Miller ................... B29C 65/106
156/366
5,639,012 A 6/1997 Urech
(Continued)

FOREIGN PATENT DOCUMENTS

JP 5-69151 A 3/1993
JP 8-71762 A 3/1996
(Continued)

OTHER PUBLICATIONS

Korean Office Action, dated May 27, 2019, for Korean Application No. 10-2018-7005954, with an English translation.
(Continued)

*Primary Examiner* — Hung D Nguyen
(74) *Attorney, Agent, or Firm* — Birch, Stewart, Kolasch & Birch, LLP.

(57) ABSTRACT

A welding apparatus including: a welding unit (20) that includes a pair of electrode wheels (21A, 21B) arranged to face each other with a welding object therebetween; a pressing unit (30) that includes a pair of press rolls (31A, 31B) that are arranged to face each other with the welding object therebetween and press a welded portion of the welding object welded by the electrode wheels (21A, 21B); a cooling unit (40) that supplies a cooling medium toward the welded portion pressed by the press rolls; a heating unit (50) that heats the welded portion cooled by the cooling unit (40); and a moving body (10) that supports the welding unit
(Continued)

(20), the pressing unit (30), the cooling unit (40), and the heating unit (50), and reciprocates in a welding direction of the welding object.

15 Claims, 11 Drawing Sheets

(51) Int. Cl.
| | | |
|---|---|---|
| *B23K 11/36* | (2006.01) | |
| *B23K 11/16* | (2006.01) | |
| *B23K 9/32* | (2006.01) | |
| *B23K 11/30* | (2006.01) | |
| *B23K 37/00* | (2006.01) | |
| *B23K 101/18* | (2006.01) | |
| *B23K 103/04* | (2006.01) | |

(52) U.S. Cl.
CPC .......... *B23K 11/3036* (2013.01); *B23K 11/36* (2013.01); *B23K 37/003* (2013.01); *C21D 9/505* (2013.01); *B23K 2101/18* (2018.08); *B23K 2103/04* (2018.08); *C21D 9/50* (2013.01)

(58) Field of Classification Search
CPC .. B23K 11/3036; B23K 11/36; B23K 37/003; B23K 37/0408; B23K 37/047; B23K 2103/04; B23K 2101/12; B23K 2101/18; C21D 9/50; C21D 9/505

USPC ........ 219/78.01, 81, 82, 83, 84, 85.16, 86.1, 219/86.22, 86.23, 86.25, 86.31, 86.32
See application file for complete search history.

(56) References Cited

U.S. PATENT DOCUMENTS

| | | | |
|---|---|---|---|
| 5,676,862 | A | 10/1997 | Matteson |
| 2013/0168365 | A1 | 7/2013 | Kaga et al. |

FOREIGN PATENT DOCUMENTS

| | | | |
|---|---|---|---|
| JP | 2007-245166 A | * | 9/2007 |
| JP | 2015-136725 A | | 7/2015 |
| KR | 1992-0007692 B1 | | 9/1992 |
| KR | 10-0993986 B1 | | 11/2010 |
| KR | 10-2012-0040056 A | | 4/2012 |
| KR | 10-2014-0060043 A | | 5/2014 |
| WO | WO 2012/039060 A1 | | 3/2012 |

OTHER PUBLICATIONS

Korean Office Action, dated Jan. 21, 2020, for Korean Application No. 10-2018-7005954, with an English translation.

* cited by examiner

WELDING APPARATUS AND WELDING METHOD

TECHNICAL FIELD

The present invention relates to mash seam welding.

BACKGROUND ART

Mash seam welding is, for example as described in Patent Literature 1, lapping ends of two metal plates, pressurizing the lapped portion using a pair of electrode wheels, continuously welding the lapped portion while passing a welding current, and then flattening a step of the lapped portion using a pair of press rolls. Patent Literature 1 provides a mash seam welding method and apparatus that ensures high joining strength and reliability in mash seam welding of metal plates each having a thickness of 2 mm or more, and thus allows joining of metal plates each having a thickness of 4.5 mm or more.

CITATION LIST

Patent Literature

Patent Literature 1: International Publication No. WO2012/039060

SUMMARY OF INVENTION

Technical Problem

With the mash seam welding method disclosed in Patent Literature 1, metal plates each having a thickness of 4.5 mm or more can be joined, and welded metal plates are then rolled, for example. Even after the rolling, it is required to keep integrity without any defect in a welded portion.

Thus, the present invention has an object to provide a welding apparatus capable of improving a mechanical property of a welded portion by mash seam welding.

Solution to Problem

A welding apparatus of the present invention includes: a welding unit; a pressing unit; a cooling unit; a heating unit; and a moving body.

The welding unit includes a pair of electrode wheels arranged to face each other with a welding object therebetween.

The pressing unit includes a pair of press rolls that are arranged to face each other with the welding object therebetween and press a welded portion of the welding object welded by the electrode wheels.

The cooling unit supplies a cooling medium toward the welded portion pressed by the press rolls.

The heating unit heats the welded portion cooled by the cooling unit.

The moving body supports the welding unit, the pressing unit, the cooling unit, and the heating unit, and reciprocates in a welding direction of the welding object.

A welding method of the present invention includes a step A; a step B; a step C; and a step D performed in order.

A step A is welding a welding object using a pair of electrode wheels arranged to face each other with the welding object therebetween.

A step B is pressing a welded portion welded by the electrode wheels using a pair of press rolls arranged to face each other with the welding object therebetween.

A step C is supplying cooling water from a water spray nozzle toward the welded portion pressed by the press rolls.

A step D is heating the welded portion cooled by the cooling water using a heater.

In the welding method of the present invention, the electrode wheels, the press rolls, the water spray nozzle, and the heater integrally reciprocate in a forward path for movement from a retracted position to an advanced position and in a backward path for movement from the advanced position to the retracted position. In the welding method of the present invention, the step A, the step B, the step C, and the step D are performed in order in the backward path.

Advantageous Effects of Invention

According to the welding apparatus of the present invention, the cooling unit and the heating unit in addition to the welding unit and the pressing unit are provided on the moving body. Thus, cooling for quenching and heating for tempering can be performed immediately after welding by the welding unit and pressing of the welded portion by the pressing unit. Thus, the welding apparatus of the present invention allows quenching and tempering in addition to refinement of crystal grains in the welded portion, thereby improving a mechanical property of the welded portion.

BRIEF DESCRIPTION OF DRAWINGS

FIG. 1A is a side view, and FIG. 1B is a plan view.

FIG. 2A shows a mill scale removing step, FIG. 2B shows a shearing step, FIG. 2C shows a welding step, and FIG. 2D shows a pressing step.

FIG. 4A shows the welding apparatus in a retracted position, FIG. 4B shows a position during the mill scale removing step, and FIG. 4C shows a position during a cutting step.

FIG. 5A shows a position during the welding step and the pressing step, FIG. 5B shows a position during the cooling step, FIG. 5C shows a position during the heating step, and FIG. 5D shows the welding apparatus having returned to a retracted position.

DESCRIPTION OF EMBODIMENT

Figure 1A:
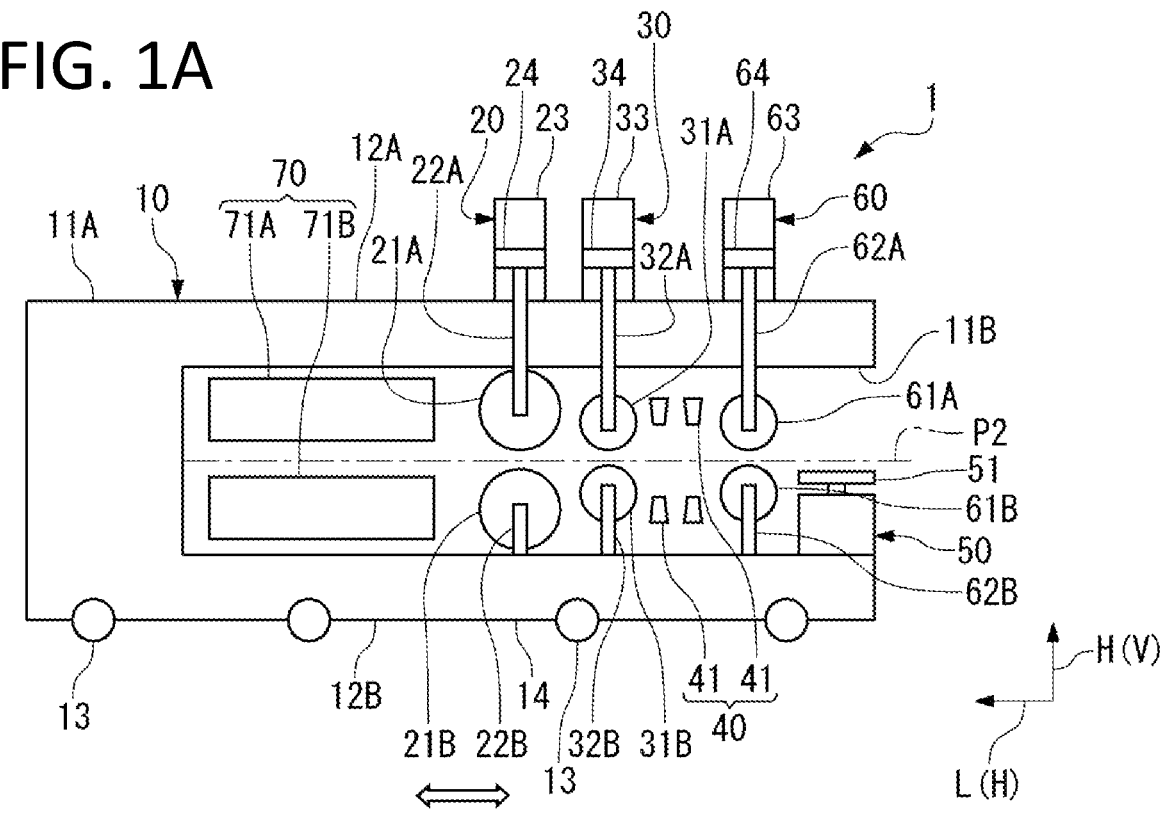
FIG. 1A and FIG. 1B each show a welding apparatus according to an embodiment of the present invention.

Now, a welding apparatus 1 according to a preferred embodiment of the present invention will be described with reference to the drawings.

The welding apparatus 1 is provided in a middle of a conveying path P1 through which steel plates S are rolled and conveyed, and connects the steel plates by welding. The welding apparatus 1 includes a welding unit 20 and a pressing unit 30 that presses a portion welded by the welding unit 20, and also a cooling unit 40 and a heating unit 50, which are supported by a common moving frame 10. Adopting the integral support structure allows the welding apparatus 1 to quench and temper the welded portion immediately after welding. Now, a configuration and an operation of the welding apparatus 1 will be described in order, and then effects of the welding apparatus 1 will be described.

[Configuration of Welding Apparatus 1]

Figure 1B:
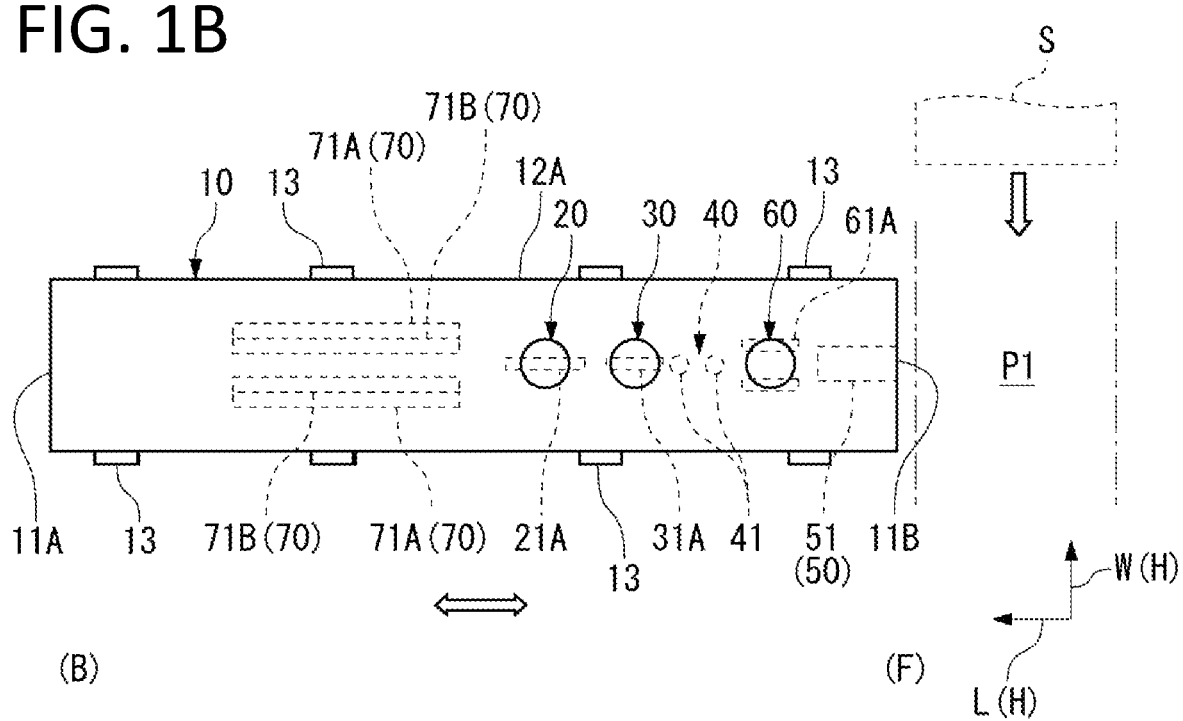

As shown in FIGS. 1A and 1B, the welding apparatus 1 includes the welding unit 20 that performs mash seam welding (JIS Z3001), and the pressing unit 30 that pressurizes a portion welded by the welding unit 20. As shown in FIGS. 2A to 2D, the welded portion includes a rear end of a preceding steel plate S1 and a front end of a succeeding steel plate S2 lapped, and has a step thicker than other portions. The pressing unit 30 crushes the step to substantially the same thickness as the other portions to improve a flatness level.

Also, the welding apparatus 1 includes the cooling unit 40 that supplies spray water toward the welded portion pressed by the pressing unit 30, and the heating unit 50 that heats the welded portion to which the spray water has been supplied.

Further, the welding apparatus 1 includes a mill scale removing unit 60 that mainly removes an oxide on a surface of the steel plate S as a welding object before welding, and a cutting unit 70 that cuts off, by shearing, an end of the steel plate S from which the oxide has been removed by the mill scale removing unit 60.

The welding apparatus 1 includes the welding unit 20, the pressing unit 30, the cooling unit 40, the heating unit 50, the mill scale removing unit 60, and the cutting unit 70 supported by the moving frame 10. The moving frame 10 reciprocates with respect to a previously defined conveying path P1 for the steel plate S, and along with this reciprocation, the welding unit 20, the pressing unit 30, the cooling unit 40, the heating unit 50, the mill scale removing unit 60, and the cutting unit 70 also reciprocate with respect to the conveying path P1.

The welding apparatus 1 includes the cooling unit 40 and the heating unit 50 and thus can quench and temper the welded portion. Thus, the welding apparatus 1 can weld, for example, high carbon steel and transformation induced plasticity (TRIP) steel that can be quenched and tempered. The high carbon steel refers to carbon steel having a carbon content of 0.45% to 2.00% by mass, and for example, JIS S55C corresponds thereto. Also, the TRIP steel is steel having a multiphase structure of an austenite crystal lattice generated in a high temperature range and retained in a room temperature range and a martensite crystal lattice. Since retained austenite is transformed into martensite by a slight expansion and contraction of the crystal lattice, the austenite instantaneously exhibits ductility due to a property of the austenite by applying a force of a press or the like. However, the austenite is immediately transformed into a stable hard martensite structure, increasing strength of a deformed portion.

However, the welding apparatus 1 can weld steel that does not require quenching and tempering. In this case, the cooling unit 40 and the heating unit 50 do not have to be operated.

[Moving Frame 10]

As shown in FIGS. 1A and 1B, the moving frame 10 has a C shape when viewed from a lateral side, has one end provided with a connection end 11A in a height direction H and the other end provided with an opening 11B. The height direction H matches a vertical direction V.

As shown in FIG. 1B, the moving frame 10 is arranged with the opening 11B directed toward the conveying path P1. In the moving frame 10, a side provided with the opening 11B is defined as a front side (F) and a side provided with the connection end 11A is defined as a rear side (B).

The moving frame 10 includes a pair of upper and lower support platforms 12A, 12B connecting to the connection end 11A and extending toward the front side (F). The support platforms 12A, 12B are provided in a length direction L at a predetermined interval in the height direction H. The support platform 12A is located on an upper side and the support platform 12B is located on a lower side. The length direction L matches a horizontal direction H.

The support platform 12B includes plurality of wheels 13, 13 . . . required for moving the moving frame 10 on a side of a lower surface 14. The wheels 13 can be normally or reversely rotated by a drive source (not shown) to reciprocate the moving frame 10. The wheel 13 is merely an example, and besides, for example, a linear guide may be used as moving means. The linear guide has an advantage that the moving frame 10 can be more smoothly moved and a vertical position of the moving frame 10 can be easily stabilized.

Between the support platform 12A and the support platform 12B, the heating unit 50, the mill scale removing unit 60, the cooling unit 40, the pressing unit 30, and the welding unit 20 are provided in this order from the front side.

Figure 4A:
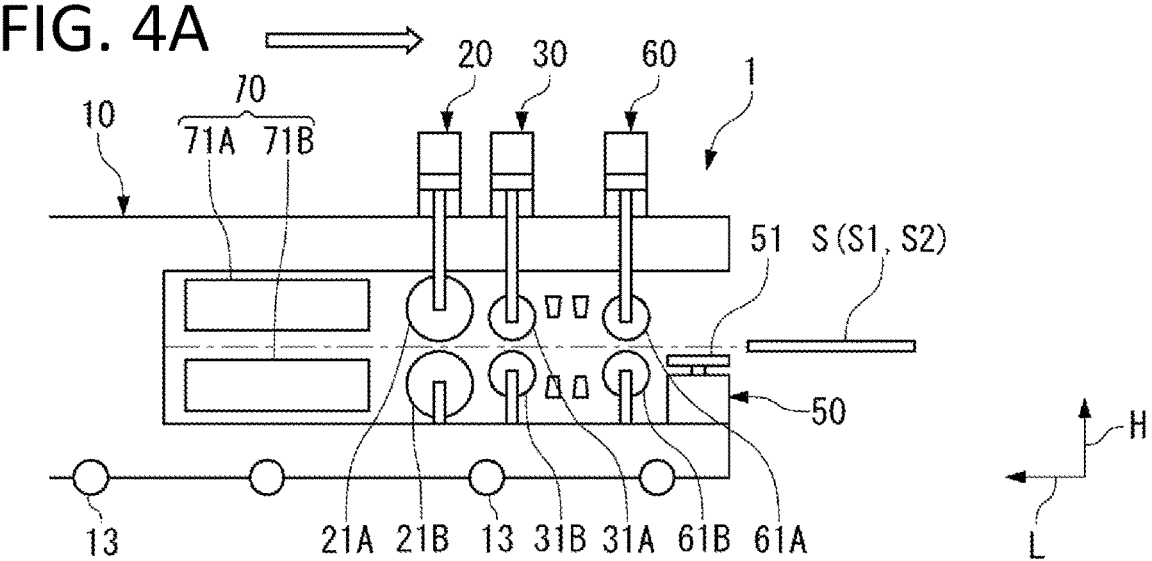
FIG. 4A, FIG. 4B and FIG. 4C each show processes of the welding apparatus of this embodiment moving in a forward path.
Figure 4B:
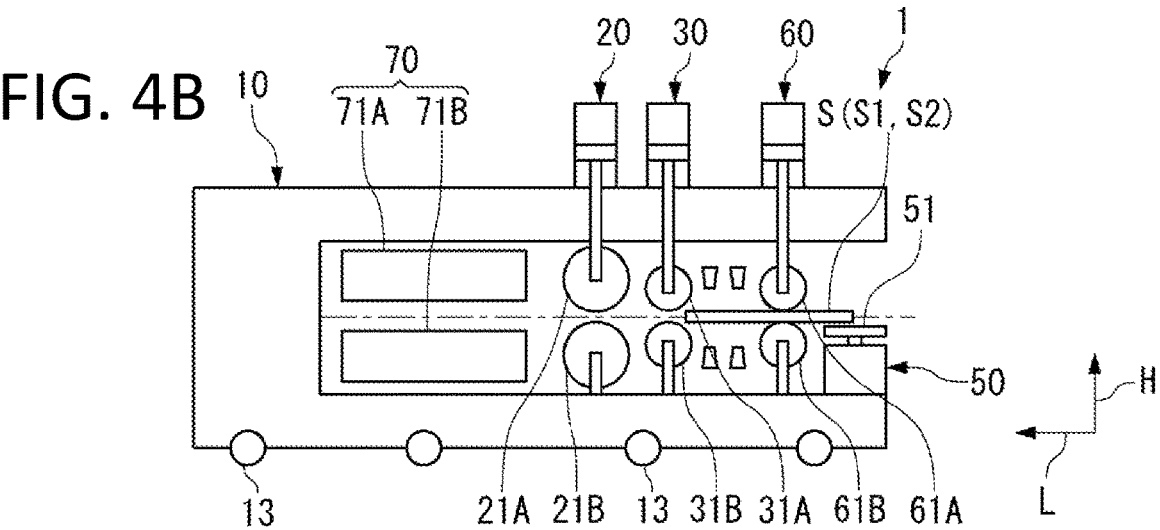
Figure 4C:
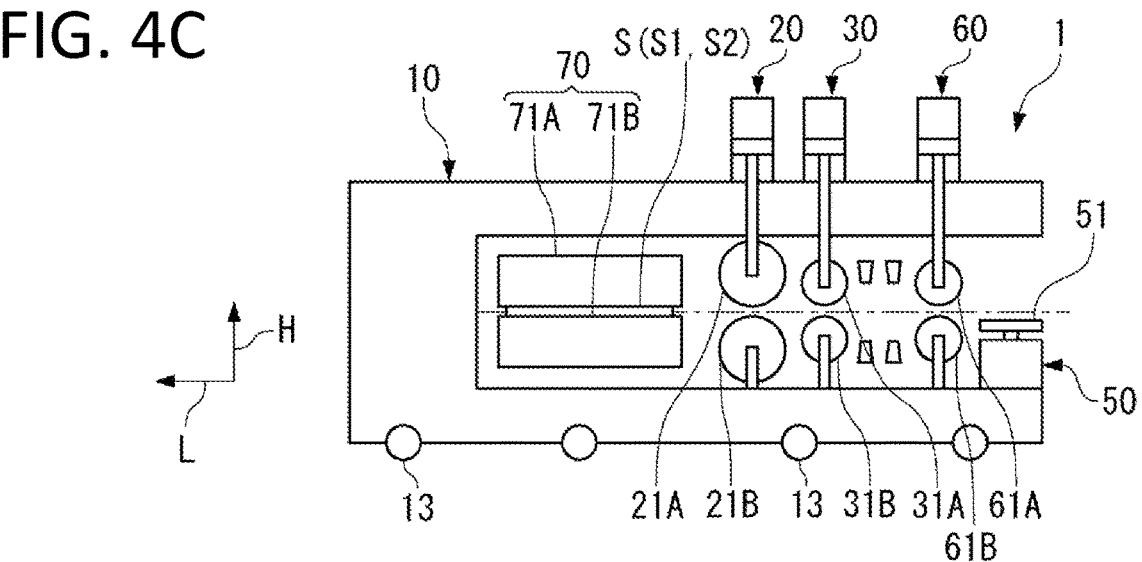

The moving frame 10 reciprocates at least between a position retracted from the conveying path P1 (FIGS. 1A, 1B and 4A: retracted position) and a position where the cutting unit 70 supported by the moving frame 10 reaches the conveying path P1 and can completely cut the steel plate S (FIG. 4C: advanced position). The moving frame 10 reciprocates in the same direction as the welding direction of the steel plate S. Even if the moving frame 10 somewhat passes through the advanced position, the moving frame 10 may move rearward to adjust its position when cutting the steel plate S. The conveying path P1 through which the steel plate S is conveyed is arranged forward of the moving frame 10 located in the retracted position. The moving frame 10 reciprocates to cause the steel plate S to relatively advance and retract between the support platform 12A and the support platform 12B of the moving frame 10. A path through which the steel plate S is moved between the support platform 12A and the support platform 12B is referred to as a moving path P2, and the moving path P2 is perpendicular to the conveying path P1.

The moving frame 10 waits in the position retracted from the conveying path P1 until the steel plate S is conveyed.

When the steel plate S is conveyed, the moving frame 10 moves from the retracted position to the advanced position. In a forward path in which the moving frame 10 moves from the retracted position to the advanced position, the mill scale removing unit 60 removes a surface oxide on the steel plate S, and the cutting unit 70 cuts the steel plate S. Operations in the forward path are shown in FIGS. 4A, 4B, and 4C as described later in detail.

When the moving frame 10 moves in the forward path to the advanced position, the moving frame 10 then moves in a backward path returning to the retracted position. In the backward path, the welding unit 20, the pressing unit 30, the cooling unit 40, and the heating unit 50 are operated to continuously perform welding, flattening of the welded portion, and heat treatment of the welded portion. Now, the mill scale removing unit 60 and the cutting unit 70 operated in the forward path will be described, and then the welding unit 20 to the heating unit 50 operated in the backward path will be described.

[Mill Scale Removing Unit 60]

The mill scale removing unit 60 removes a surface oxide on a portion to be welded of the steel plate S. As long as the mill scale removing unit 60 removes a surface oxide, the mill scale removing unit 60 may remove other materials.

Figure 2A:
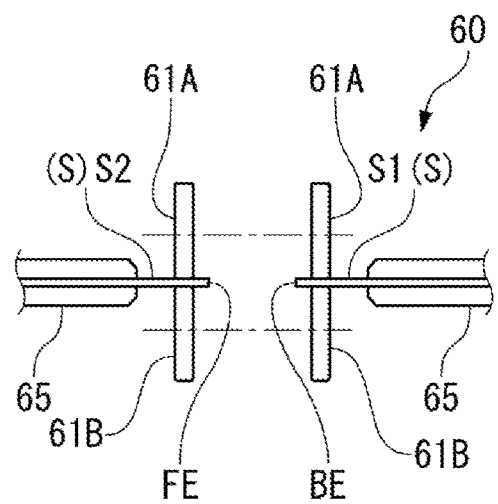
FIG. 2A, FIG. 2B, FIG. 2C and FIG. 2D are partial front views showing steps by the welding apparatus of this embodiment.

As shown in FIG. 1A, the mill scale removing unit 60 includes a pair of upper and lower brush rolls 61A, 61B, and support rods 62A, 62B that rotatably support the brush rolls 61A, 61B, respectively. In this embodiment, as shown in FIGS. 1B and 2A, two pairs of upper and lower brush rolls 61A, 61B are provided side by side at an interval in the direction of the conveying path P1. As shown in FIG. 2A, the brush rolls 61A, 61B provided on an upstream side α of the conveying path P1 remove a surface oxide on one steel plate S to be welded, and the brush rolls 61A, 61B provided on a downstream side β of the conveying path P1 remove a surface oxide on the other steel plate S to be welded. The one steel plate S is conveyed to the welding apparatus 1 before the other steel plate S, and is referred to as a preceding steel plate S1. The other steel plate S is conveyed to the welding apparatus 1 following the one steel plate S, and is referred to as a succeeding steel plate S2. When there is no need to distinguish both the steel plates, they are generally referred to as the steel plate S.

As shown in FIG. 1A, the brush rolls 61A, 61B are arranged to face each other vertically in the height direction H with the moving path P2 therebetween. The brush rolls 61A, 61B are arranged so that their positions in the length direction L and the width direction W match.

As shown in FIG. 2A, outer peripheral surfaces of the brush rolls 61A, 61B come into contact with an upper surface and a lower surface of the steel plate S to cut away and so on and remove the surface oxide. As long as the brush rolls 61A, 61B can remove a surface oxide, the brush rolls may use any specific removing means, and for example, an abrasive wheel having hard abrasive grains accumulated on an outer peripheral surface, or a brush having wires with hard tips arranged on an outer peripheral surface may be applied.

The brush roll 61A arranged above the moving path P2 is supported by a hydraulic cylinder 63, and moved up and down with respect to the moving path P2. The support rod 62A that supports the brush roll 61A constitutes a piston rod connecting to a piston 64 of the hydraulic cylinder 63.

When the brush rolls 61A, 61B are used to remove the surface oxide, the brush roll 61A is moved down to bring the brush rolls 61A, 61B into contact with the steel plate S with suitable pressure.

The brush roll 61B arranged below the moving path P2 is supported by the support rod 62B secured to the support platform 12B, and can be moved up and down with respect to the moving path P2 like the brush roll 61A. The up-and-down relationship described here applies to electrode wheels 21A, 21B of the welding unit 20 and press rolls 31A, 31B of the pressing unit 30 described later.

As shown in FIG. 2A, the brush rolls 61A, 61B remove the surface oxide on a region at a predetermined distance from a rear end BE of the preceding steel plate S1, and remove the surface oxide on a region at a predetermined distance from a front end FE of the succeeding steel plate S2. The rear end side of the region on which the surface oxide is to be removed of the preceding steel plate S1 and the front end side of the region on which the surface oxide is to be removed of the succeeding steel plate S2 are cut and removed by the cutting unit 70.

[Cutting Unit 70]

The cutting unit 70 cuts and removes the predetermined region described above of the preceding steel plate S1 and the succeeding steel plate S2 from which the surface oxide has been removed by the mill scale removing unit 60.

As shown in FIG. 1A, the cutting unit 70 includes a pair of upper and lower shearing edges 71A, 71B that are moved up and down by a drive source (not shown).

Figure 2B:
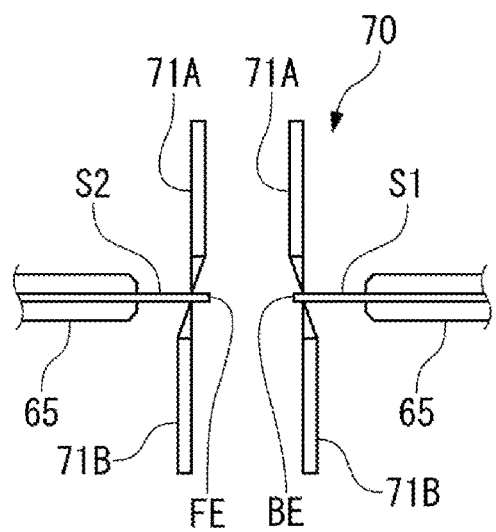

In this embodiment, as shown in FIGS. 1B and 2B, two pairs of upper and lower shearing edges 71A, 71B are provided side by side at an interval in the direction of the conveying path P1. As shown in FIG. 2B, the shearing edges 71A, 71B provided on the upstream side α of the conveying path P1 cut the preceding steel plate S1, and the shearing edges 71A, 71B provided on the downstream side β of the conveying path P1 cut the succeeding steel plate S2.

As shown in FIG. 1A, the shearing edges 71A, 71B are arranged to face each other vertically in the height direction H with the moving path P2 therebetween. The shearing edges 71A, 71B are arranged so that their positions in the length direction L and the width direction W match.

[Welding Unit 20]

Next, the welding unit 20 will be described.

Figure 2C:
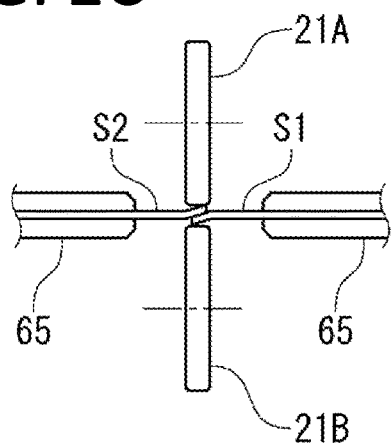

As shown in FIGS. 1A and 2C, the welding unit 20 includes a pair of upper and lower electrode wheels 21A, 21B, and support rods 22A, 22B that rotatably support the electrode wheels 21A, 21B, respectively.

The electrode wheels 21A, 21B are arranged to face each other vertically in the height direction H with the moving path P2 therebetween. The electrode wheels 21A, 21B are arranged so that their positions in the length direction L and the width direction W match.

The electrode wheel 21A arranged above the moving path P2 is supported by a hydraulic cylinder 23, and moved up and down with respect to the moving path P2. The support rod 22A that supports the electrode wheel 21A constitutes a piston rod connecting to a piston 24 of the hydraulic cylinder 23.

When the electrode wheels 21A, 21B are used to weld the steel plate S, the electrode wheel 21A is moved down to bring the electrode wheels 21A, 21B into contact with the steel plate S with suitable pressure.

The electrode wheel 21B arranged below the moving path P2 is supported by the support rod 22B secured to the support platform 12B.

[Pressing Unit 30]

Next, the pressing unit 30 will be described.

As shown in FIG. 1A, the pressing unit 30 is provided adjacent to the front side (F) of the welding unit 20, and presses and flattens the welded portion of the steel plates S welded by the welding unit 20. Plastic forming performed here is referred to as HYPERLINK "http://www.jaroc.co.jp/corp/swaging.html" Swaging.

Figure 2D:
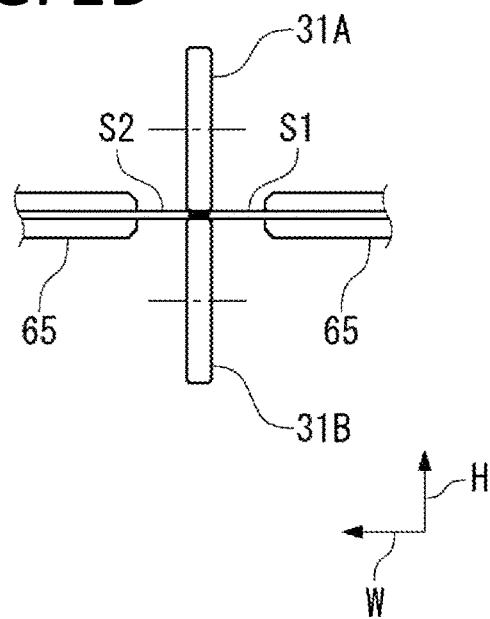

As shown in FIGS. 1A and 2D, the pressing unit 30 includes a pair of upper and lower press rolls 31A, 31B, and support rods 32A, 32B that rotatably support the press rolls 31A, 31B, respectively. In FIGS. 2A to 3C, the welded portion is shown by solid lines.

The press rolls 31A, 31B are arranged to face each other vertically in the height direction H with the moving path P2 therebetween. The press rolls 31A, 31B are arranged so that their positions in the length direction L and the width direction W match.

The press roll 31A arranged above the moving path P2 is supported by the hydraulic cylinder 33, and moved up and down with respect to the moving path P2. The support rod 32A that supports the press roll 31A constitutes a piston rod connecting to a piston 34 of the hydraulic cylinder 33. When the press rolls 31A, 31B are used to apply pressure to the welded portion, the press roll 31A is moved down to cause the press rolls 31A, 31B to apply suitable pressure to the welded portion of the steel plates S.

The press roll 31B arranged below the moving path P2 is supported by the support rod 32B secured to the support platform 12B. The press roll 31B may be moved up and down with respect to the moving path P2 by expansion and contraction of the support rod 32B.

As described later in detail, a surface temperature of a portion rolled by the welding unit 20 is, for example, higher than 1300° C., but decreased to, for example, 700° C. or lower by the pressing unit 30 coming into contact with the portion, and then increased by recalescence.

[Cooling Unit 40]

Next, the cooling unit 40 will be described.

Figure 3A:
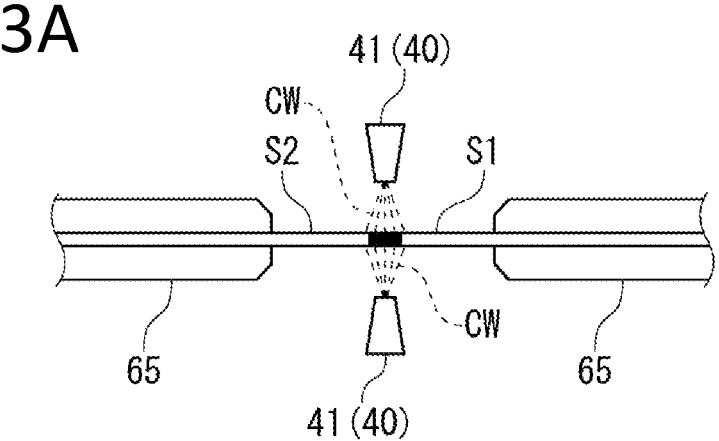
FIG. 3A shows a cooling step.

As shown in FIGS. 1A, 1B and 3A, the cooling unit 40 supplies cooling water CW from a water spray nozzle 41 to both an upper surface and a lower surface of the welded portion flattened by the pressing unit 30. The cooling water CW is supplied to rapidly cool and quench the welded portion. Quenching will be described later in detail.

The cooling water CW is preferably supplied in the form of particles. The form of particles includes the form of a mist having a small particle size and the form of a shower having a larger particle size than the mist, but cooling water in the form of the mist is preferable for the following reason. Specifically, using the cooling water in the form of the mist reduces an amount of water used. This allows a compact and simple water treatment facility, and further, reducing the amount of water also reduces the amount of cooling water reaching the pressing unit 30.

In the example shown here, the cooling units 40 are provided above and below the moving path P2. However, this is merely an example, and the cooling unit 40 may be provided only above or below the moving path P2 as long as a sufficient cooling capability can be obtained. One or three or more cooling units 40 may be provided along the moving path P2. The example of the cooling water CW as a cooling medium is shown here, but a different cooling medium, for example, air may be used as long as a sufficient cooling capability can be obtained.

[Heating Unit 50]

Next, the heating unit 50 will be described.

Figure 3B:
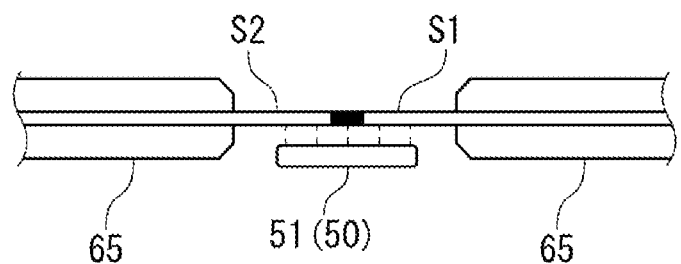
FIG. 3B shows a heating step.

As shown in FIGS. 1A, 1B and 3B, the heating unit 50 uses a heater 51 to heat and temper the welded portion quenched by the cooling water supplied from the cooling unit 40.

Any mechanism for the heating unit 50 to heat the welded portion may be used as long as it can provide a tempering action. For example, a heater using a heating wire, a heater using flame, a heater using induction heating (IH) may be applied.

Among them, the IH heater applies an electromagnetic field generated by an electromagnetic coil to the welded portion of the steel plates S to pass an induced eddy current through the welded portion. Since the steel plate S has electrical resistance, the flowing current causes the welded portion to generate heat. As such, using the IH heater as the heating unit 50 can easily achieve rapid heating of the steel plate S. Tempering will be described later in detail.

Figure 3C:
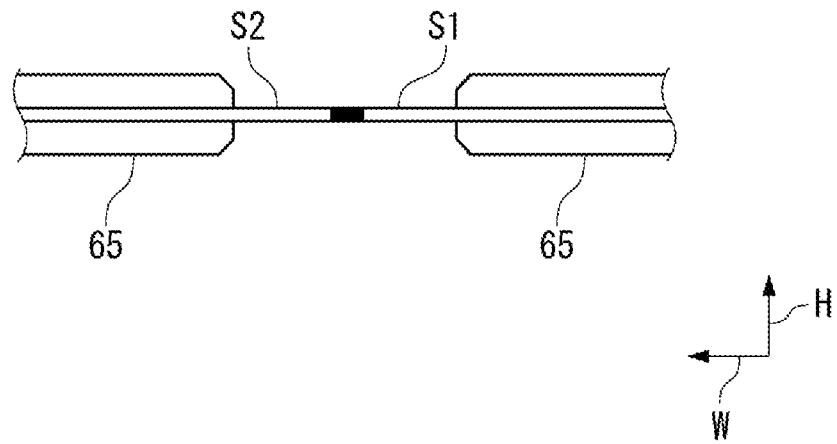
FIG. 3C shows an air-cooling step, following FIGS. 2A to 2D.

As shown in FIG. 3C, when the steel plate S passes through the heating unit 50, the steel plate S is air-cooled to a room temperature by ambient air. The preceding steel plate S1 and the succeeding steel plate S2 connected at the welded portion are fed to, for example, a next rolling step as an integral steel plate S.

The heating unit 50 is provided only below the steel plate S here, but the heating units 50 may be provided both above and below the steel plate S.

[Welding Procedure]

Next, further with reference to FIGS. 4A to 5D, a procedure for welding the preceding steel plate S1 and the succeeding steel plate S2 using the welding apparatus 1 will be described. FIGS. 4A to 4C show processes of the welding apparatus 1 moving in the forward path, and FIGS. 5A to 5D show processes of the welding apparatus 1 moving in the backward path.

Now, as shown in FIG. 4A, the welding apparatus 1 waits in the retracted position, and the preceding steel plate S1 and the succeeding steel plate S2 are conveyed to predetermined positions. Then, as shown in FIG. 2A, the preceding steel plate S1 and the succeeding steel plate S2 are held by clamps 65, 65, respectively and fixed in position. When the fixing is completed, the welding apparatus 1 starts moving in the forward path. In the forward path, the welding unit 20 and the pressing unit 30 are separated from the preceding steel plate S1 and the succeeding steel plate S2 so as not to come into contact therewith. Supply of the cooling water from the cooling unit 40 is stopped, and the heating unit 50 is not yet in a heating state.

When the moving frame 10 of the welding apparatus 1 further moves in the forward path, as shown in FIGS. 2A and 4B, the mill scale removing unit 60 reaches the steel plates S (preceding steel plate S1 and succeeding steel plate S2), and further passes through the steel plates S, thereby removing a surface oxide on the steel plates S.

When the welding apparatus 1 further moves in the forward path to the advance position, as shown in FIGS. 2B and 4C, the cutting unit 70 reaches the steel plates S (preceding steel plate S1 and succeeding steel plate S2). Then, the shearing edge 71A is moved down and the shearing edge 71B is moved up to cut the preceding steel plate S1 and the succeeding steel plate S2, respectively.

The procedure in the forward path is now finished, and then the welding apparatus 1 moves in the backward path. When the welding apparatus 1 moves in the forward path, the welding unit 20 and the pressing unit 30 are ready to come into contact with the preceding steel plate S1 and the succeeding steel plate S2, and the cooling unit 40 sprays cooling water.

Figure 5A:
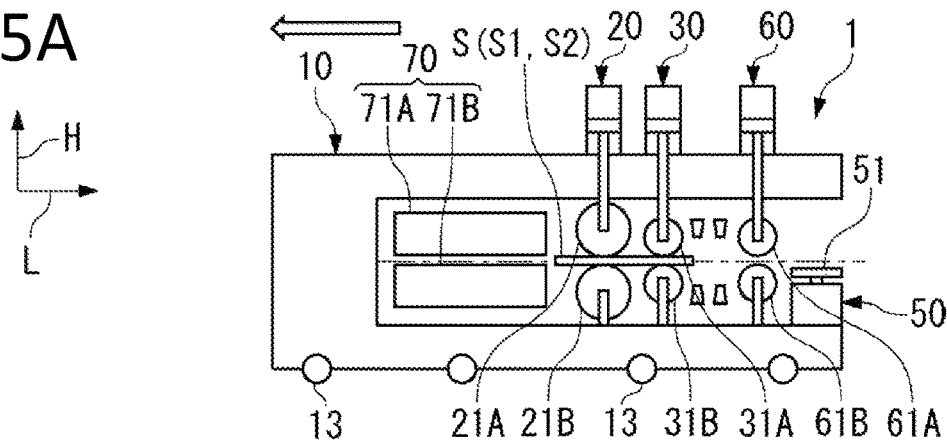
FIG. 5A, FIG. 5B, FIG. 5C and FIG. 5D each show processes of the welding apparatus in FIGS. 1A and 1B moving in a backward path following FIGS. 4A to 4C.

When the welding apparatus 1 starts moving in the backward path, the steel plates S pass through the cutting unit 70, and then pass through the welding unit 20 and the pressing unit 30 in order as shown in FIG. 5A. The preceding steel plate S1 and the succeeding steel plate S2 pass through the welding unit 20 and are thus welded as shown in FIG. 2C. Then, the steel plates pass through the pressing unit 30, and thus the welded portion is flattened to substantially the same thickness as other portions as shown in FIG. 2D.

Figure 5B:
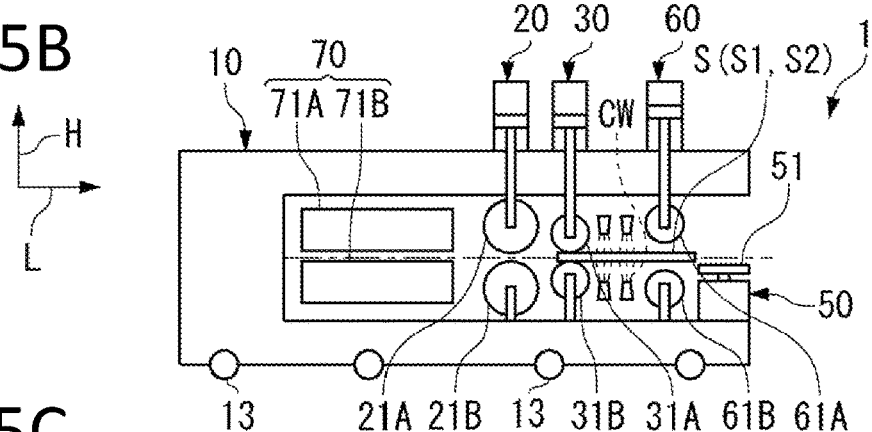

When the welded portion crushed by the pressing unit 30 reaches the cooling unit 40 as shown in FIG. 5B, the cooling water CW supplied in the form of the mist adheres to and rapidly cool the welded portion. This rapid cooling quenches the welded portion.

Figure 5C:
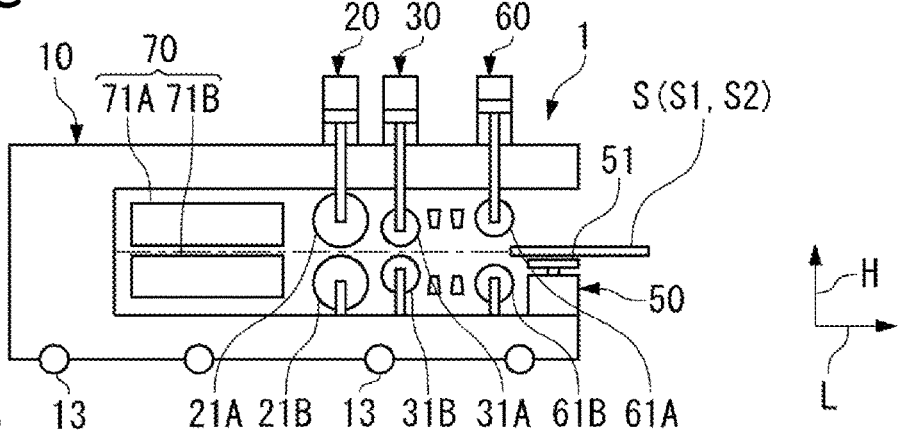

When the welding apparatus 1 further moves in the backward path, as shown in FIG. 5C, the steel plates S are heated to a predetermined temperature during passage above the heating unit 50, and thus the quenched welded portion is tempered.

Figure 5D:
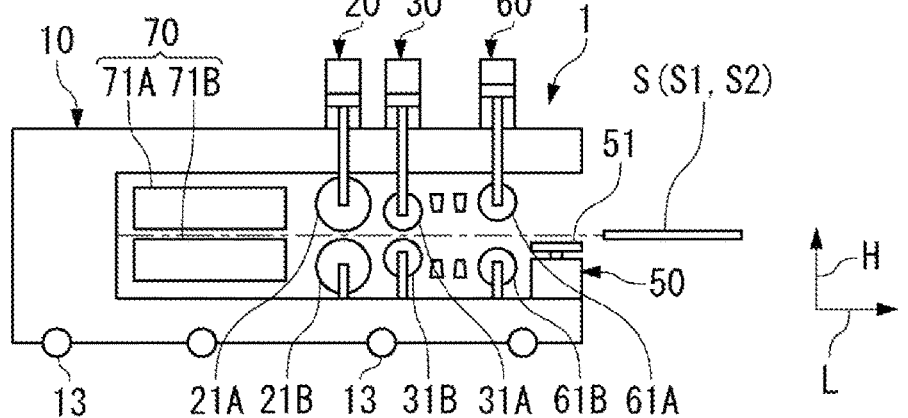

When the welding apparatus 1 further moves in the backward path, as shown in FIG. 5D, the welding apparatus 1 returns to the retracted position, and a series of procedures for welding the preceding steel plate S1 and the succeeding steel plate S2 is completed. Then, the steel plate S including the preceding steel plate S1 and the succeeding steel plate S2 connected to each other is conveyed to a next step.

[Temperature History of Welded Portion]

Figure 6:
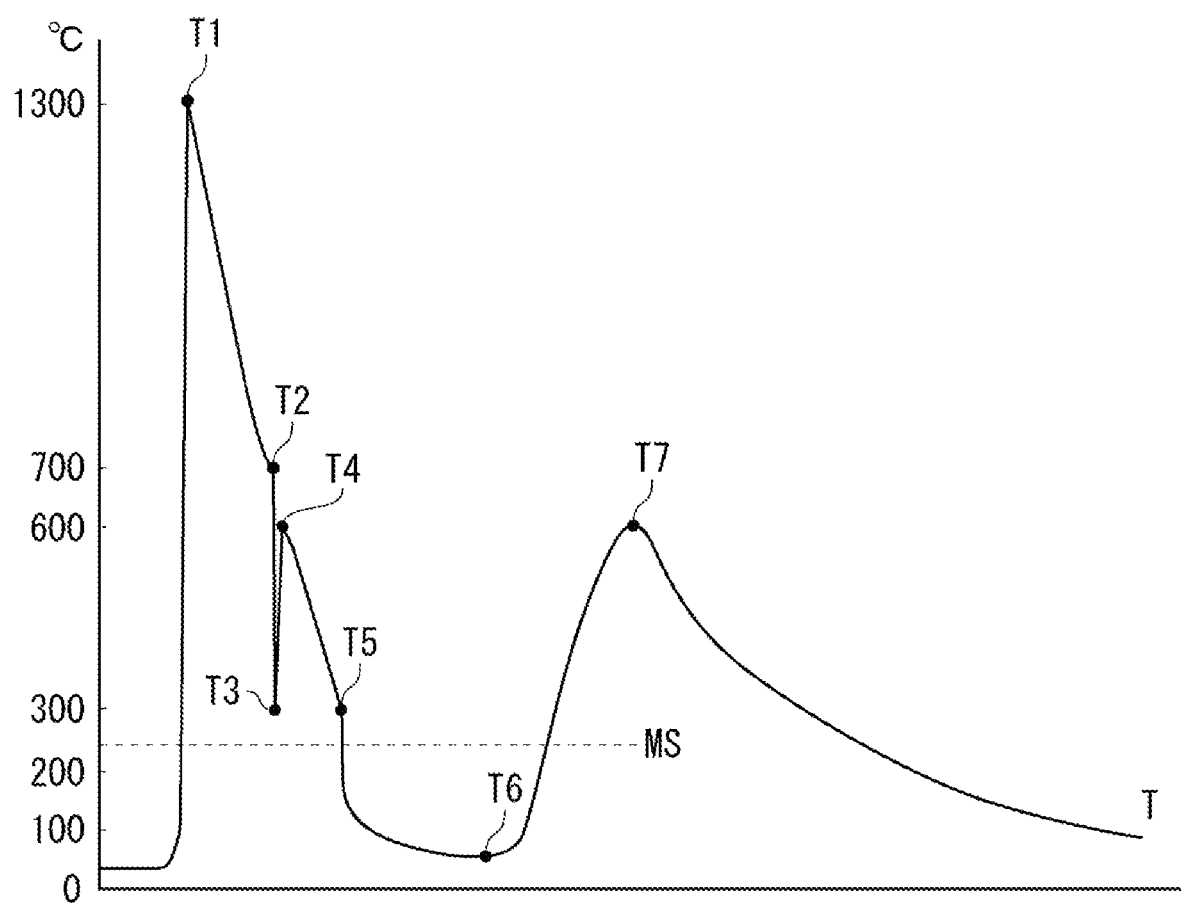
FIG. 6 is a graph showing a history of a surface temperature of a welding unit during the welding step, the pressing step, a water-cooling step, the heating step, and the air-cooling step performed by the welding apparatus of this embodiment.

The welded portion of the preceding steel plate S1 and the succeeding steel plate S2 is welded by the welding unit 20, crushed by the pressing unit 30, rapidly cooled by the cooling unit 40, and heated by the heating unit 50. With reference to FIG. 6, an example of the temperature history of the welded portion will be described. The temperature shown in FIG. 6 is obtained by observing the surface of the steel plate S. FIG. 6 illustrates a temperature history of TRIP steel.

As shown in FIG. 6, when the welding unit 20 performs welding, a temperature of the welded portion of the steel plates S (hereinafter simply referred to as the welded portion) rapidly increases to, for example, a peak temperature T1 of 1300° C. or higher. Thus, the welded portion includes an austenite ($\gamma$) structure as a mother phase. It is considered that welding by the welding unit 20 involves pressing and that rolling is performed in a recrystallization temperature range, and thus the austenite ($\gamma$) phase is refined. When the steel plates S pass through the welding unit 20, the steel plates S are cooled by ambient air, and thus the temperature of the welded portion decreases to T2.

Further, when the welded portion comes into contact with the pressing unit 30, heat is drawn from the welded portion by the pressing unit 30 as the cooling medium, and thus the temperature of the welded portion further rapidly decreases from the temperature T2 to a temperature T3. However, the temperature decrease is limited to the surface and therearound of the welded portion that comes into contact with the pressing unit 30. As an example, during passage through the pressing unit 30, the temperature decreases within a range of 1100° C. to 500° C.

During flattening of the step by the pressing unit 30, the austenite ($\gamma$) phase that is not recrystallized is flattened. This increases a grain boundary area per unit volume that forms a nucleation site of transformation.

When the welded portion passes through the pressing unit 30, the temperature thereof increases. The temperature decrease due to the contact with the pressing unit 30 is limited to the surface and therearound of the welded portion, while heat is supplied from a region remote from the surface, where a high temperature is maintained, to cause recalescence to a temperature T4. After the recalescence, the welded portion is air-cooled and thus the temperature decreases to a temperature T5.

After the recalescence, the cooling water from the cooling unit 40 is supplied to the welded portion, and thus the temperature rapidly decreases from the temperature T5 and the welded portion is quenched. After the temperature rapidly decreases, the temperature slowly decreases to a temperature T6, and the welded portion is quenched. The slow temperature decrease is due to the welded portion having passed through a region in which the cooling water is sprayed.

The welded portion is rapidly cooled by supplying the cooling water to increase a transformation driving force and suppress growth of ferrite ($\alpha$) grains.

After the temperature T6, the temperature of the welded portion then increases. This is because the welded portion reaches the heating unit 50, and the temperature increase continues to a temperature T7 corresponding to the welded portion having passed through the heating unit 50. Then, the welded portion is air-cooled to room temperature. The temperature increase and decrease cause the welded portion to be tempered.

Now, quenching and tempering will be described.

Quenching refers to a treatment for hardening steel by heating steel to a transformation temperature or higher to rapidly cool the steel from a state of an austenite structure (face-centered cubic lattice) and thus transforming the austenite structure into a martensite structure (body-centered tetragonal lattice) so as to prevent precipitation of other structures.

The welding apparatus 1 can perform quenching through welding by the welding unit 20, flattening of the step by the pressing unit 30, and supply of the cooling water by the cooling unit 40.

During quenching, a temperature at which martensite starts to be generated is referred to as an Ms point, and a temperature at which a martensite transformation is completed is referred to as an Mf point. The martensite transformation proceeds as the temperature decreases, and thus when the temperature reaches the Ms point, the transformation proceeds even if slow cooling is performed. Thus, quenching can be performed by air cooling, but forced cooling using the cooling unit 40 can minimize an increase in cycle time required for welding.

FIG. 6 shows an example of the Ms point. The forced cooling by supply of the cooling water cools the welded portion to lower than the Ms point, and for high carbon steel, the welded portion is preferably cooled to lower than the Mf point.

Next, tempering will be described.

Tempering is a heat treatment performed for reducing hardness and recovering toughness of quenched steel. In the tempering, the steel is heated to a temperature equal to or lower than an Ac1 transformation temperature, and for focusing the viscosity, the steel is heated to a higher temperature, for example, 400° C. or higher, and for focusing the hardness, the steel is heated to a lower temperature, for example, around 200° C.

[Effects]

Now, effects achieved by the welding apparatus 1 of this embodiment will be described.

First, with the welding apparatus 1 of this embodiment, cooling for quenching and heating for tempering can be performed immediately after welding by the welding unit 20 and flattening of the step by the pressing unit 30. Thus, the welding apparatus 1 can refine crystal grains in a recrystallization zone of a structure of the welded portion, flatten the crystal grains in a non-recrystallization zone, and quench and temper the welded portion, thereby improving a mechanical property of the welded portion. Thus, even if the steel plate S including the preceding steel plate S1 and the succeeding steel plate S2 welded to each other is then rolled, it is highly unlikely that the welded portion causes a defect.

The inventors evaluated an Erichsen value of the welded portion having been subjected to steps (a) and (b). As a result, the step (b) corresponding to this embodiment, that is, quenching and tempering recover the Erichsen value to about 80%. This value reaches about twice a value in the step (a) of annealing. This result demonstrated the effect of the welding apparatus 1. The Erichsen value (%) above is represented as a ratio when a matrix is 100.
(a) Annealing after flattening by the pressing unit 30
(b) Quenching and tempering after flattening by the pressing unit 30

Further, with the welding apparatus 1, in the backward path in which the cooling unit 40 and the heating unit 50 move in synchronization with the welding unit 20 and the pressing unit 30, cooling for quenching and heating for tempering can be performed. Thus, the welding apparatus 1 can minimize cycle time required for welding the preceding steel plate S1 and the succeeding steel plate S2.

Also, tempering can be performed immediately after quenching, thereby reliably avoiding delayed crack that may occur when the steel plate is left for long hours after quenching.

In addition, with the welding apparatus 1, the welding unit 20, the pressing unit 30, the cooling unit 40, and the heating unit 50 are secured to the moving frame 10 from the retracted position to the advanced position, and thus relative positions do not change. This allows an interval between the steps of welding to tempering, for example, an interval between flattening of the step by the pressing unit 30 and forced cooling by the cooling unit 40, and an interval between forced cooling by the cooling unit 40 and heating for tempering by the heating unit 50 to be fixed. Thus, in welding repeatedly performed, conditions for quenching and tempering are fixed, thereby stably improving a mechanical property of the welded portion.

The preferred embodiment of the present invention has been described above. The components listed in the above embodiment may be chosen or changed to other components without departing from the gist of the present invention.

In particular, in the welding apparatus 1, the cooling unit 40 sprays cooling water, and thus properly treating the cooling water is important for ensuring the effect of flattening of the step by the pressing unit 30. Then, with reference to FIGS. 7A to 12, some measures for properly treating the cooling water will be described.

[Waterproof Cover 35 of Pressing Unit 30]

Figure 7A:
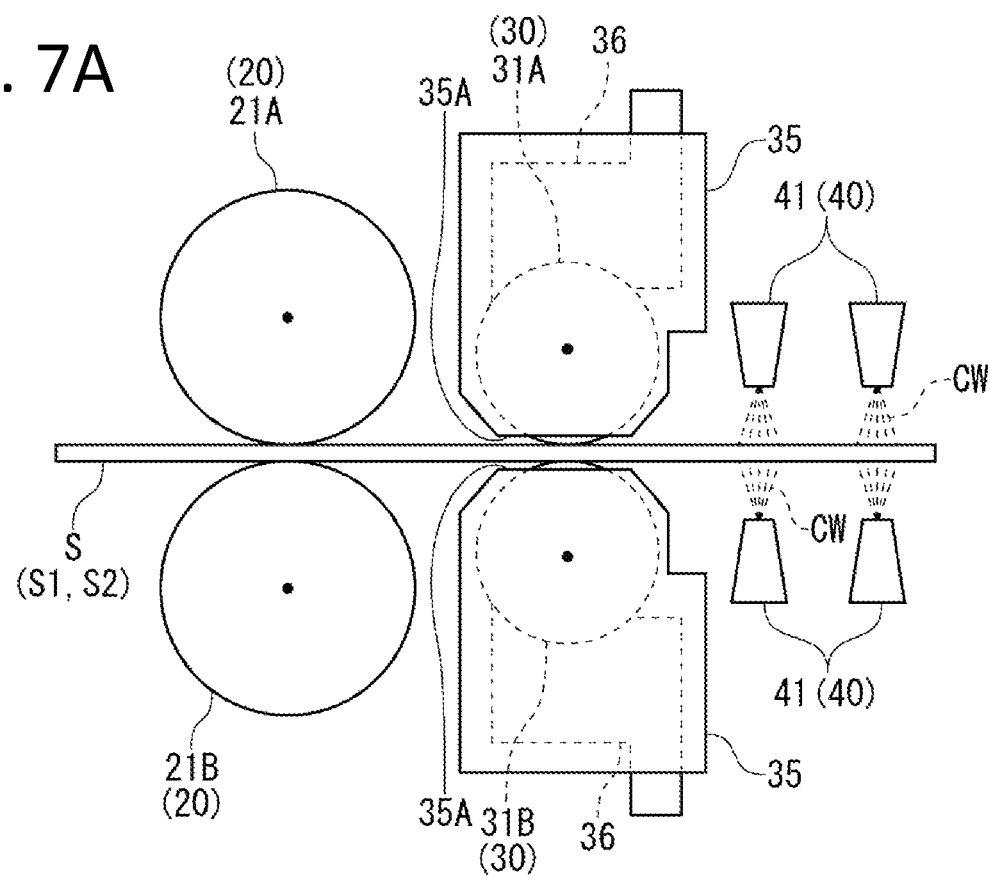
FIG. 7A and FIG. 7B each show a preferred variant of this embodiment.

First, as shown in FIG. 7A, an example in which the pressing unit 30 includes a waterproof cover 35 will be described.

The waterproof covers 35 surround the press rolls 31A, 31B except openings 35A required for the press rolls 31A, 31B to come into contact with the welded portion (stepped portion). The press rolls 31A, 31B are covered with the waterproof covers 35, thereby preventing the cooling water CW discharged from the cooling unit 40 from adhering to the press rolls 31A, 31B. This can reduce a temperature decrease of the press rolls 31A, 31B, and thus reduce a temperature decrease of the pressed steel plate S, thereby preventing a reduction in capability of the press rolls 31A, 31B pressing the step of the welded portion.

When accessary devices 36 such as electric motors or speed reducers required for rotationally driving the press rolls 31A, 31B are provided adjacent to the press rolls 31A, 31B, the waterproof covers 35 can also cover the accessary devices 36. The accessary devices 36 are also covered with the waterproof covers 35, and thus prevented from water splash, thereby preventing a failure of electric components.

Figure 7B:
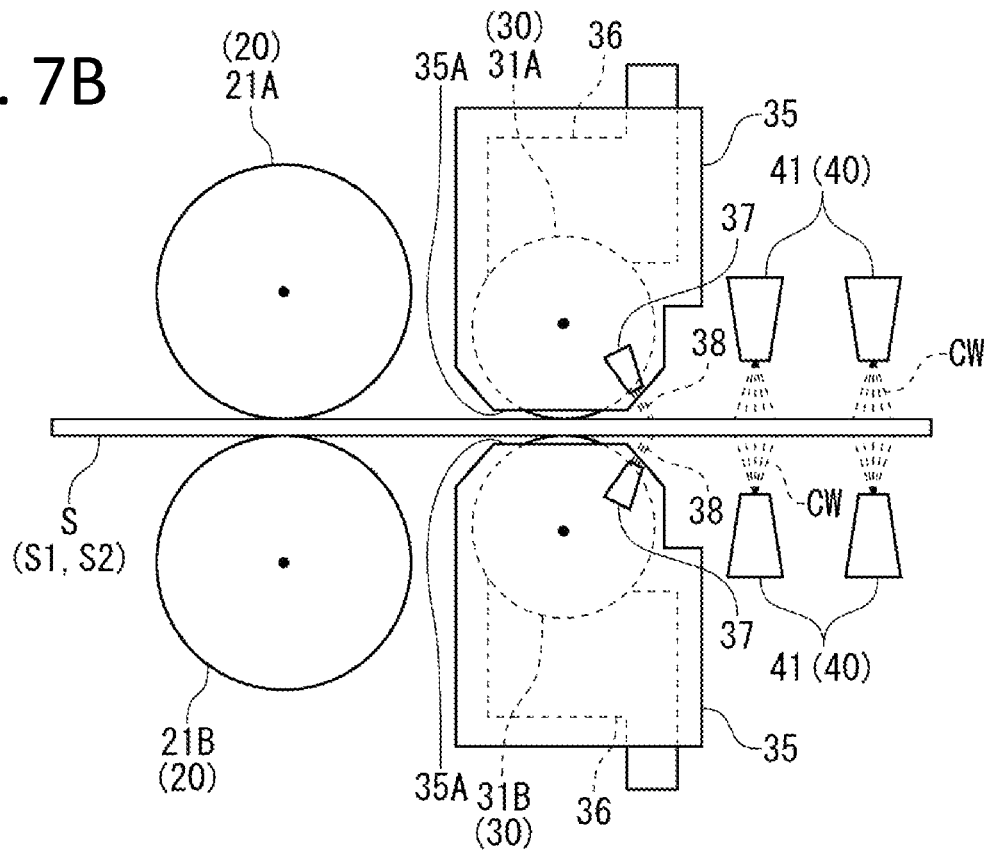

For a more prominent effect of the waterproof cover 35, as shown in FIG. 7B, an air knife 37 may be provided at a bottom of the waterproof cover 35 (between the pressing unit 30 and the cooling unit 40) on a side facing the cooling unit 40. The air knife 37 constitutes a first water stop mechanism in this embodiment.

The air knife 37 sucks ambient air using a small amount of compression gas, typically, compression air to generate a curtain 38 of air flowing at high speed. The curtains 38 are located between the openings 35A, 35A of the waterproof covers 35 and the cooling units 40, and sprayed to the upper surface and the lower surface, respectively, of the steel plate S. The air is preferably obliquely sprayed from the side of the pressing unit 30 toward the side of the cooling unit 40. Then, it is less likely that the cooling water discharged from the cooling unit 40 reaches the opening 35A of the waterproof cover 35 beyond the curtain 38.

The example of providing the air knife 37 attached to the waterproof cover 35 is shown, but the air knife 37 may be provided without the waterproof cover 35 being provided. Also, the example of the compression air as the compression gas is shown, but a non-oxidizing gas such as a nitrogen gas or an argon gas may be used as the compression gas.

[Anti-Spattering Hood 43 of Cooling Unit 40]

Figure 8A:
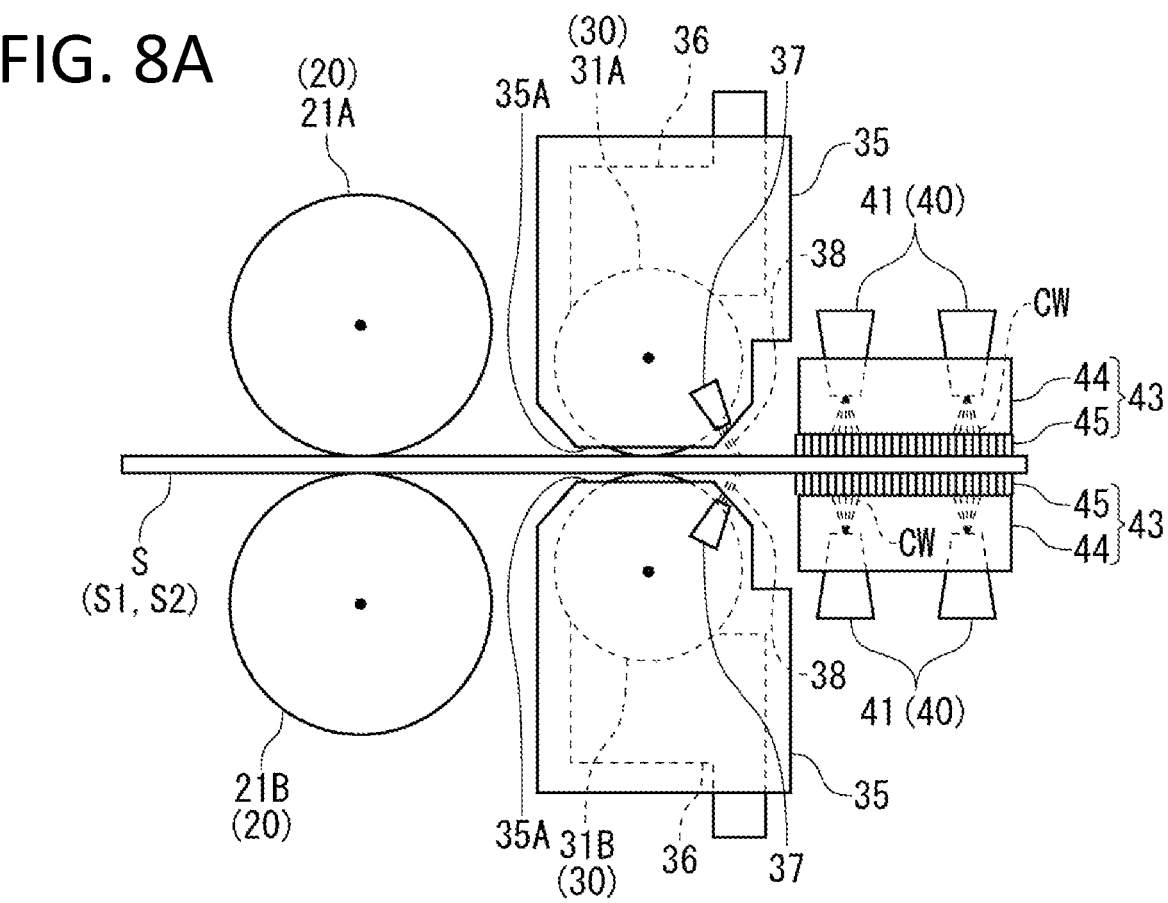
FIG. 8A and FIG. 8B each show another preferred variant of this embodiment.
Figure 8B:
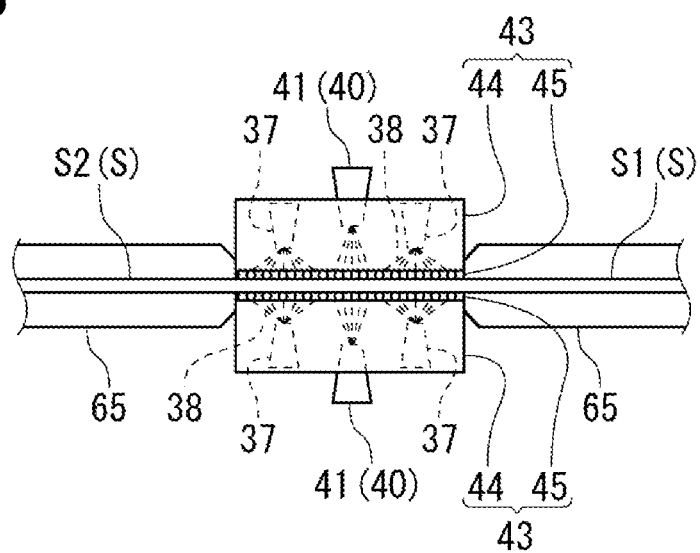

Next, as shown in FIGS. 8A and 8B, an example of an anti-spattering hood 43 that controls a spattering range of the cooling water CW discharged from the cooling unit 40 will be described.

As shown in FIGS. 8A and 8B, the anti-spattering hood 43 includes a hood body 44, and a skirt 45 provided on an edge of the hood body 44 facing the steel plate S.

The hood body 44 has a box shape with an opening at a lower end in the drawings, and is provided to accommodate a portion of the cooling unit 40 discharging the cooling water. A front edge of the hood body 44 on which the skirt 45 is provided is arranged near the upper surface or the lower surface of the steel plate S.

The skirt 45 is constituted by a brush that is an assembly of a plurality of stainless steel thin wires. One end of each thin wire is secured to the edge of the hood body 44, and the other end comes into contact with the steel plate S or is separated from the steel plate S by a minute distance, and the brush is arranged to extend toward the steel plate S.

As described above, providing the anti-spattering hood 43 allows the cooling water discharged from the cooling unit 40 to be confined in the anti-spattering hood 43. This can prevent the cooling water from spattering toward the press rolls 31A, 31B of the pressing unit 30, or minimize the spattering if any, thereby preventing the cooling water from adhering to the press rolls 31A, 31B. This prevents a reduction in capability of the pressing unit 30 pressing the step. Also, the spattering cooling water can be prevented from adhering to other devices such as the welding unit 20 or the heating unit 50, thereby suppressing degradation of the devices.

The cooling water discharged from the cooling unit 40 and then floating is confined in the anti-spattering hood 43, and thus freely falls, falls along an inner wall surface of the anti-spattering hood 43, is added to the skirt 45, and so on to adhere to the steel plate S, thereby contributing to an improvement in a cooling capability.

In FIGS. 8A and 8B, the waterproof cover 35 is provided as a preferred example, but in this embodiment, only the anti-spattering hood 43 may be provided without the waterproof cover 35 being provided. Similarly, the anti-spattering hood 43 includes the skirt 45, but the skirt 45 may be omitted as long as an opening end of the hood body 44 is close to the upper surface or the lower surface of the steel plate S. Also, the example of the brush including the stainless steel thin wires is shown as the skirt 45, but a brush including resin thin wires may be used, or a skirt other than the brush may be used.

However, the skirt 45 comprising the stainless steel brush can close a gap between the hood body 44 and the steel plate S without interfering with the operation of the apparatus even if provided close to and in contact with the steel plate S, and also has high durability. Thus, in terms of preventing the cooling water from spattering to the outside of the hood body 44 to improve use efficiency of the cooling water, the skirt 45 comprising the stainless steel brush is preferably used.

[Ejection Duct 46 of Cooling Unit 40]

Figure 9A:
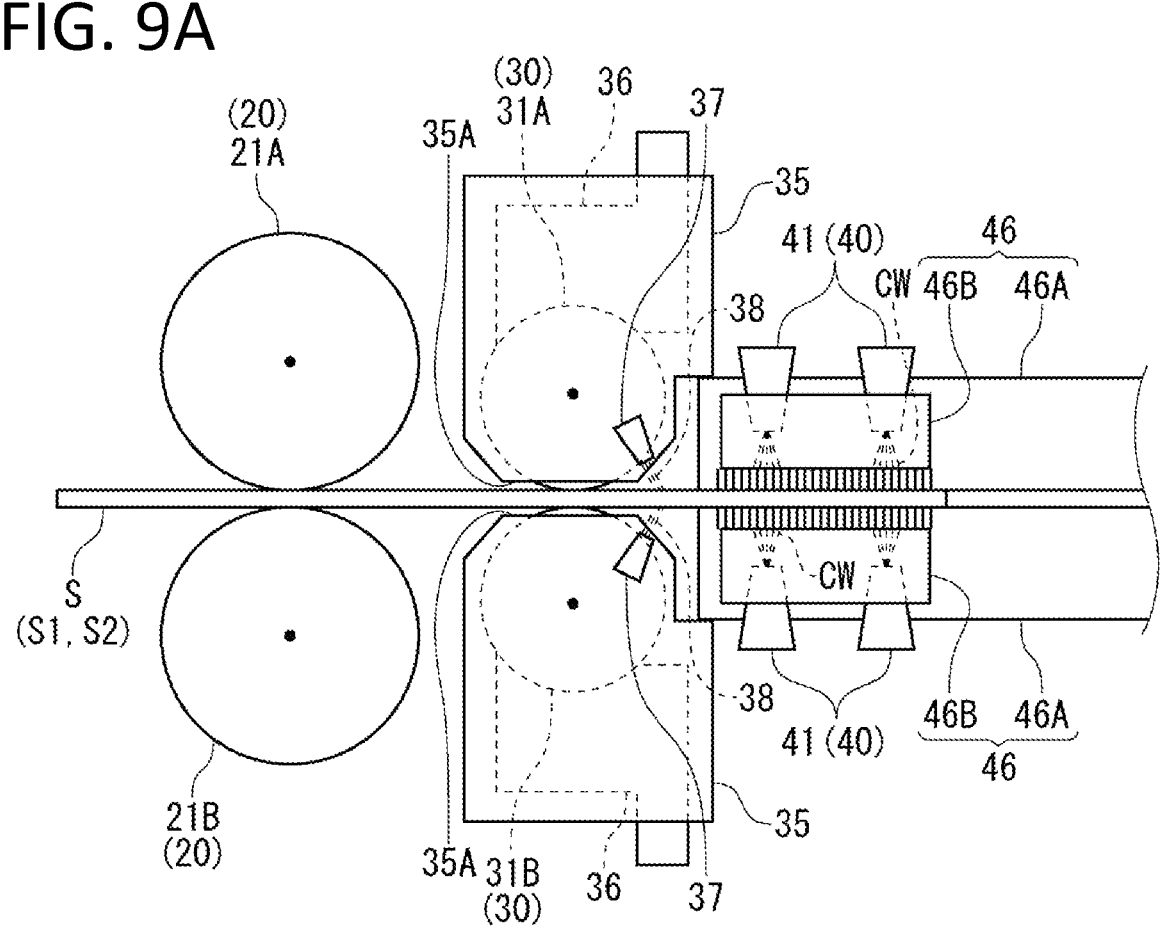
FIG. 9A and FIG. 9B each show a different preferred variant of this embodiment.
Figure 9B:
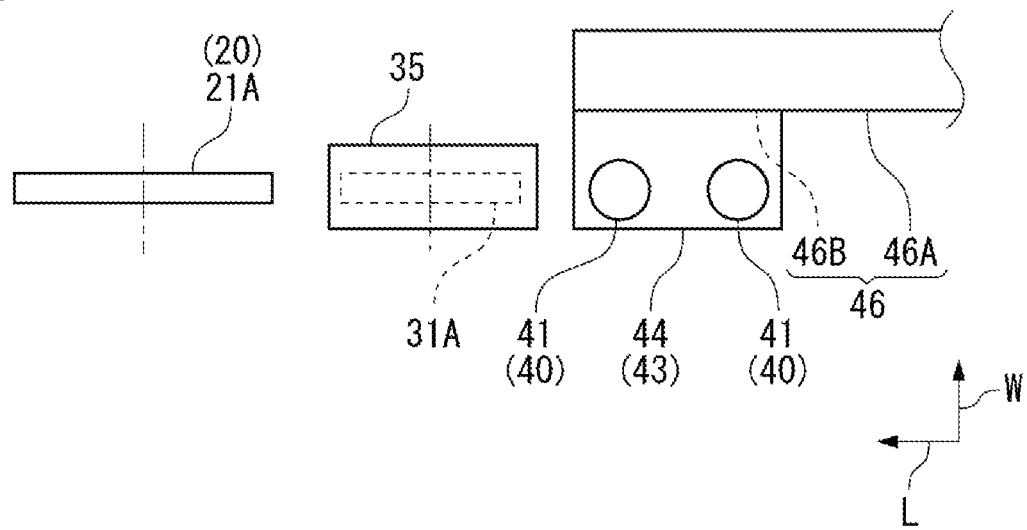

Next, as shown in FIGS. 9A and 9B, an example of an ejection duct 46 that forcedly collects the cooling water CW discharged from the cooling unit 40 will be described. The ejection duct 46 constitutes a second water stop mechanism in this embodiment.

As shown in FIGS. 9A and 9B, the ejection duct 46 is provided on one side of the anti-spattering hood 43 in a width direction W. The ejection duct 46 includes a duct body 46A, an inlet port 46B connecting the duct body 46A and the anti-spattering hood 43, and an outlet port (not shown) that ejects the cooling water CW collected in the duct body 46A to the outside. The duct body 46A is constituted by a stretchable and flexible pipe completely or partially in a bellows shape. The ejection duct 46 can apply a pressure reducing force to the inside of the anti-spattering hood 43 by rotation of a fan (not shown) or the like.

As described above, the ejection duct 46 is provided to forcedly eject the cooling water discharged from the cooling unit 40. This prevents the cooling water from spattering toward the press rolls 31A, 31B of the pressing unit 30, and thus prevents the cooling water from adhering to the press rolls 31A, 31B, thereby allowing a force to press the step of the pressing unit 30 to be maintained. Also, the spattering cooling water can be prevented from adhering to other devices such as the welding unit 20 or the heating unit 50, thereby suppressing degradation of the devices. Further, the outlet port 46B of the ejection duct 46 is provided substantially opposite to the press rolls 31A, 31B with the water spray nozzle 41 therebetween, thereby effectively preventing the cooling water from spattering toward the press rolls 31A, 31B.

Figure 10A:
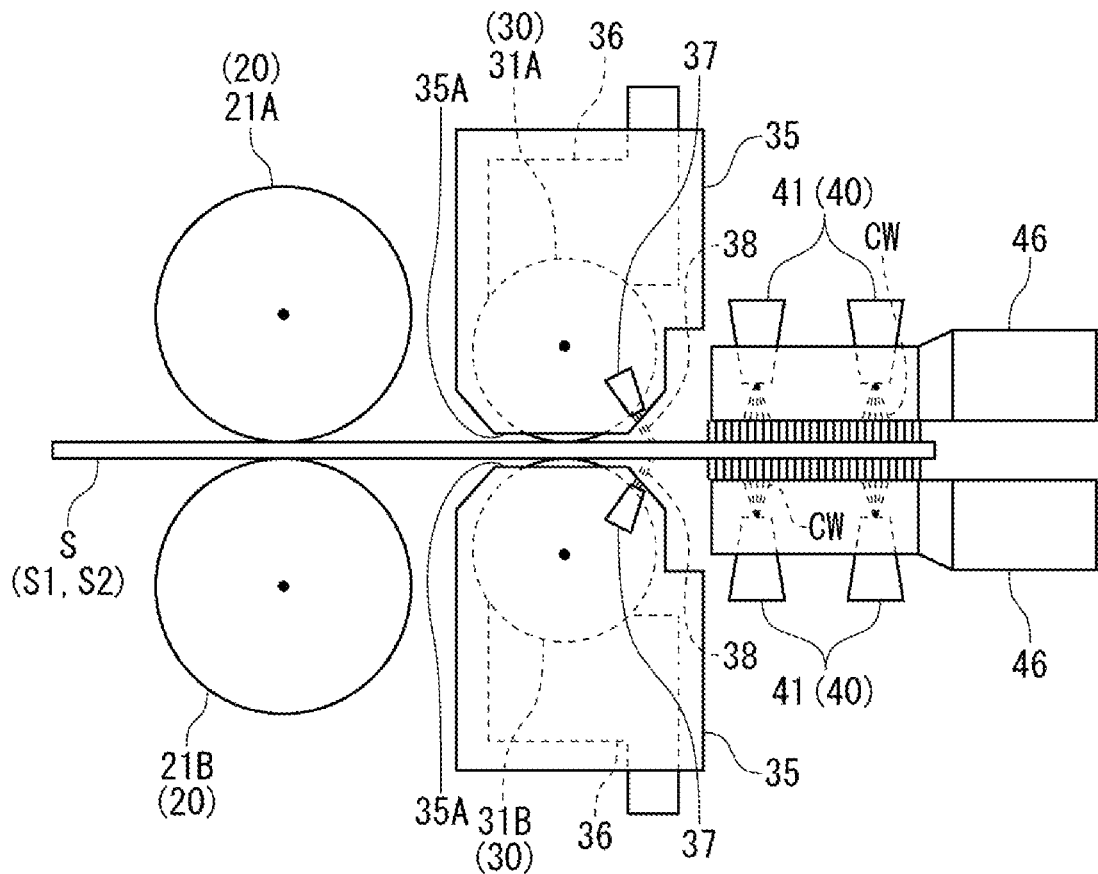
FIG. 10A and FIG. 10B each show a different preferred variant of this embodiment.
Figure 10B:
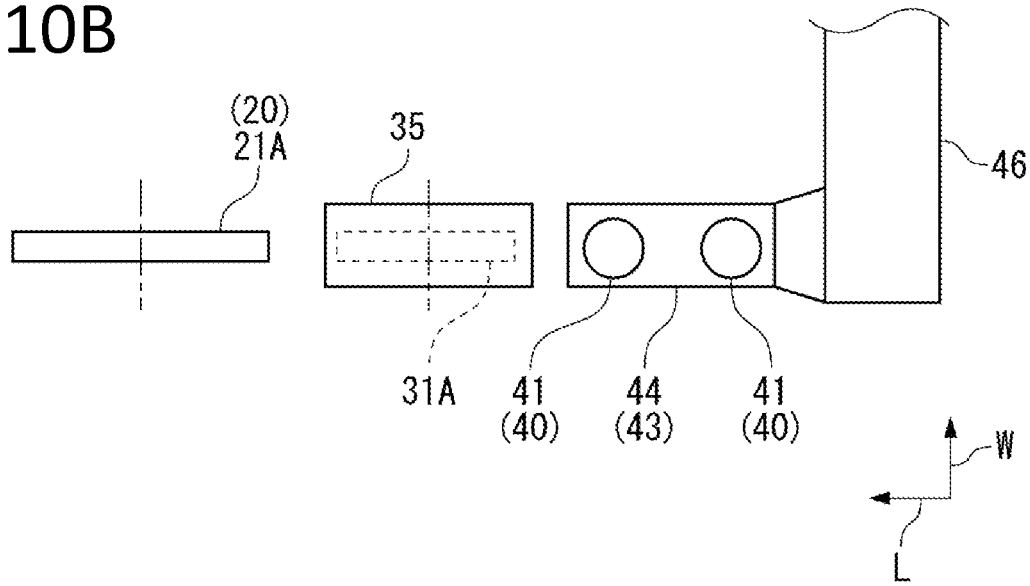

FIGS. 9A and 9B show the example of providing the ejection duct 46 on the lateral side of the anti-spattering hood 43 accommodating the cooling unit 40. However, this embodiment is not limited to this, but as shown in FIGS. 10A and 10B, the ejection duct 46 may be provided rearward of the cooling unit 40. This ejection duct 46 can achieve the same effect as described above.

FIGS. 9A to 10B show the examples of the ejection ducts 46 provided both above and below the steel plate S. However, this embodiment is not limited to this, but the ejection duct 46 may be provided above or below the steel plate S or the ejection ducts 46 may be provided both above and below the steel plate S. When the ejection duct 46 is provided only above or below the steel plate S, the ejection duct 46 is preferably provided above the steel plate S, because it is less likely that the cooling water, if freely falls, adheres to the device such as the pressing unit 30 below the steel plate S.

Also, the examples shown in FIGS. 9A to 10B include the waterproof cover 35 (FIGS. 7A and 7B) and the anti-spattering hood 43 (FIGS. 8A and 8B), but in this embodiment, only the ejection duct 46 may be provided. Even when only the ejection duct 46 is provided, the ejection duct 46 may be provided rearward of the cooling unit 40, and the ejection duct 46 may be provided above or below the steel plate S or the ejection ducts 46 may be provided both above and below the steel plate S.

Figure 11:
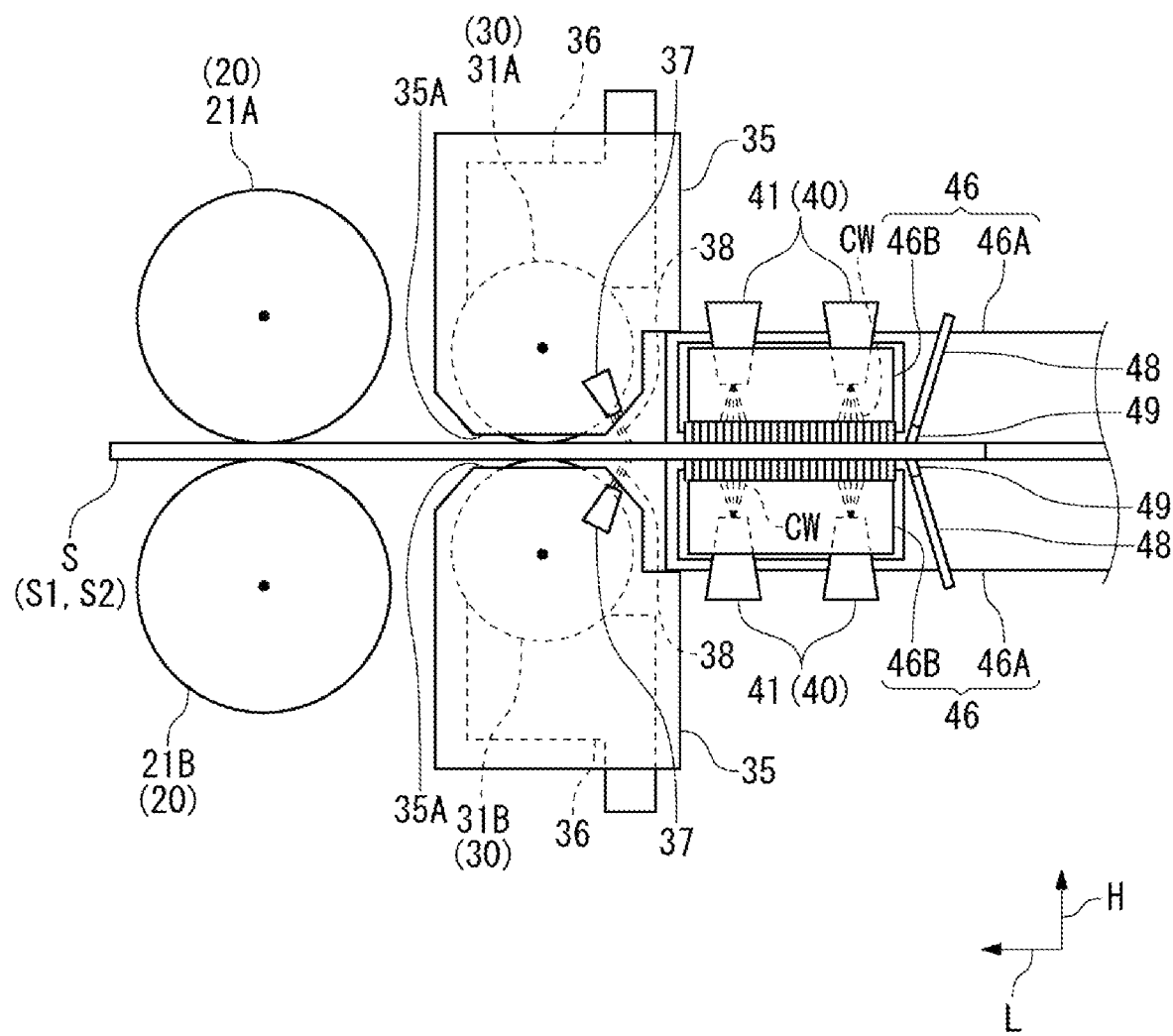
FIG. 11 shows a different preferred variant of this embodiment.

Also as shown in FIG. 11, a scraper 48 may be provided rearward of the cooling unit 40. The scraper 48 is provided above the steel plate S to scrape off the cooling water accumulated on the upper surface of the steel plate S, and confine the cooling water in the anti-spattering hood 43 or eject the cooling water out of the system through the ejection duct 46. This can prevent the cooling water from flowing to the heating unit 50 or flowing to the lower surface of the steel plate S.

It is preferable that an air nozzle 49 is mounted to a front end portion of the scraper 48, and a compression gas, for example, compression air is sprayed from the air nozzle 49 toward the steel plate S. This contributes to confining the cooling water in the anti-spattering hood 43, or ejecting the cooling water out of the system through the ejection duct 46. The air nozzle 49 constitutes the second water stop mechanism in this embodiment.

REFERENCE SIGNS LIST 1 welding apparatus
10 moving frame
12A, 12B support platform
20 welding unit
21A, 21B electrode wheel
30 pressing unit
31A, 31B press roll
35 waterproof cover
37 air knife
38 curtain
40 cooling unit
41 water spray nozzle
43 anti-spattering hood
44 hood body
45 skirt
46 ejection duct
46A duct body
48 scraper
49 air nozzle
50 heating unit
51 heater
60 mill scale removing unit
61A, 61B brush roll
70 cutter
71A, 71B shearing edge
S steel plate
S1 preceding steel plate
S2 succeeding steel plate

The invention claimed is:
1. A welding apparatus comprising:
a welding unit that includes a pair of electrode wheels arranged to face each other with a welding object therebetween;
a pressing unit that includes a pair of press rolls that are arranged to face each other with the welding object therebetween and press a welded portion of the welding object welded by the electrode wheels;

a cooling unit that supplies a cooling medium toward the welded portion pressed by the press rolls;

a heating unit that heats the welded portion cooled by the cooling unit; and a moving body that supports the welding unit, the pressing unit, the cooling unit, and the heating unit, and reciprocates in a welding direction of the welding object.

2. The welding apparatus according to claim 1, wherein the moving body reciprocates in a forward path for movement from a retracted position to an advanced position and in a backward path for movement from the advanced position to the retracted position, and the welding unit, the pressing unit, the cooling unit, and the heating unit are provided in order from the retracted position toward the advanced position on the moving body.

3. The welding apparatus according to claim 1, wherein the cooling unit includes one or more water spray nozzles that spray cooling water as the cooling medium.

4. The welding apparatus according to claim 3, further comprising a second water stop mechanism that prevents the cooling water from the cooling unit from moving toward the heating unit.

5. The welding apparatus according to claim 4, wherein the second water stop mechanism applies a pressure reducing force to the cooling water.

6. The welding apparatus according to claim 4, wherein the second water stop mechanism sprays a compression gas toward the welding object.

7. The welding apparatus according to claim 3, further comprising an anti-spattering hood that prevents the cooling water from the water spray nozzle from spattering around.

8. The welding apparatus according to claim 7, further comprising a skirt extending toward the welding object on an edge of the anti-spattering hood facing the welding object.

9. The welding apparatus according to claim 7, further comprising an ejection duct that is connected to the anti-spattering hood and partially or entirely has flexibility, wherein pressure in the anti-spattering hood is reduced via the ejection duct.

10. The welding apparatus according to claim 1, wherein the pressing unit includes a waterproof cover that surrounds the press rolls.

11. The welding apparatus according to claim 1, wherein a mill scale removing unit that removes mill scale on an upper surface and a lower surface of the welding object, and a cutting unit that removes an unnecessary portion of the welding object by cutting are supported by the moving body.

12. A welding apparatus comprising:

a welding unit that includes a pair of electrode wheels arranged to face each other with a welding object therebetween;

a pressing unit that includes a pair of press rolls that are arranged to face each other with the welding object therebetween and press a welded portion of the welding object welded by the electrode wheels;

a cooling unit that supplies a cooling medium toward the welded portion pressed by the press rolls, the cooling unit including one or more water spray nozzles that spray cooling water as the cooling medium;

a heating unit that heats the welded portion cooled by the cooling unit;

a moving body that supports the welding unit, the pressing unit, the cooling unit, and the heating unit, and reciprocates in a welding direction of the welding object; and a first water stop mechanism that is provided between the pressing unit and the cooling unit and prevents the cooling water from the cooling unit from moving toward the press rolls.

13. The welding apparatus according to claim 12, wherein the first water stop mechanism sprays a compression gas toward the welding object.

14. A welding method comprising:

a step A of welding a welding object using a pair of electrode wheels arranged to face each other with the welding object therebetween;

a step B of pressing a welded portion welded by the electrode wheels using a pair of press rolls arranged to face each other with the welding object therebetween;

a step C of supplying cooling water from a water spray nozzle toward the welded portion pressed by the press rolls; and a step D of heating the welded portion cooled by the cooling water using a heater, wherein the electrode wheels, the press rolls, the water spray nozzle, and the heater integrally reciprocate in a forward path for movement from a retracted position to an advanced position and in a backward path for movement from the advanced position to the retracted position, and the step A, the step B, the step C, and the step D are performed in order in the backward path.

15. The welding method according to claim 14, wherein the welded portion is quenched through the step B and the step C, and the welded portion is tempered through the step D.

* * * * *